United States Patent
Rahmel et al.

(10) Patent No.: US 10,510,346 B2
(45) Date of Patent: Dec. 17, 2019

(54) SYSTEMS, METHODS, AND COMPUTER-READABLE STORAGE DEVICE FOR GENERATING NOTES FOR A MEETING BASED ON PARTICIPANT ACTIONS AND MACHINE LEARNING

(71) Applicant: Microsoft Technology Licensing, LLC, Redmond, WA (US)

(72) Inventors: Heiko Rahmel, Bellevue, WA (US);
Li-Juan Qin, Redmond, WA (US);
Xuedong Huang, Bellevue, WA (US);
Wei Xiong, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 128 days.

(21) Appl. No.: 15/807,704

(22) Filed: Nov. 9, 2017

(65) Prior Publication Data
US 2019/0139543 A1 May 9, 2019

(51) Int. Cl.
| | |
|---|---|
| *G10L 15/00* | (2013.01) |
| *G10L 15/22* | (2006.01) |
| *G10L 15/08* | (2006.01) |
| *G06F 3/01* | (2006.01) |
| *G10L 25/48* | (2013.01) |
| *G06F 3/0484* | (2013.01) |
| *G06N 20/00* | (2019.01) |

(Continued)

(52) U.S. Cl.
CPC .............. *G10L 15/22* (2013.01); *G06F 3/017* (2013.01); *G06F 3/04842* (2013.01); *G06N 20/00* (2019.01); *G10L 15/08* (2013.01); *G10L 25/48* (2013.01); *G10L 15/30* (2013.01); *G10L 25/90* (2013.01); *G10L 2015/088* (2013.01); *G10L 2015/223* (2013.01)

(58) Field of Classification Search
CPC ....................................................... G10L 15/00
USPC ............ 704/500, 233, 235, 260, 9; 709/204; 715/730, 744, 846
See application file for complete search history.

(56) References Cited

U.S. PATENT DOCUMENTS

| | | | |
|---|---|---|---|
| 6,014,135 A * | 1/2000 | Fernandes | G06F 3/0481 709/203 |
| 6,260,011 B1 * | 7/2001 | Heckerman | G09B 5/062 704/235 |

(Continued)

*Primary Examiner* — Michael C Colucci
(74) *Attorney, Agent, or Firm* — Drinker Biddle & Reath LLP

(57) ABSTRACT

Systems, methods, and computer-readable storage devices are disclosed for generating smart notes for a meeting based on participant actions and machine learning. One method including: receiving meeting data from a plurality of participant devices participating in an online meeting; continuously generating text data based on the received audio data from each participant device of the plurality of participant devices; iteratively performing the following steps until receiving meeting data for the meeting has ended, the steps including: receiving an indication that a predefined action has occurred on the first participating device; generating a participant segment of the meeting data for at least the first participant device from a first predetermined time before when the predefined action occurred to when the predefined action occurred; determining whether the receiving meeting data of the meeting has ended; and generating a summary of the meeting.

20 Claims, 9 Drawing Sheets

(51) Int. Cl.
*G10L 15/30* (2013.01)
*G10L 25/90* (2013.01)

(56) References Cited

U.S. PATENT DOCUMENTS

| | | | | |
|---|---|---|---|---|
| 8,428,227 | B2* | 4/2013 | Angel | G10L 15/26 |
| | | | | 379/68 |
| 9,304,614 | B2* | 4/2016 | Kwong | G06F 3/038 |
| 9,602,444 | B2* | 3/2017 | Hawker | G06F 16/90324 |
| 9,818,400 | B2* | 11/2017 | Paulik | G06F 16/9535 |
| 10,009,474 | B1* | 6/2018 | Pettay | G10L 15/26 |
| 10,187,432 | B2* | 1/2019 | Katekar | H04L 65/1083 |
| 10,236,017 | B1* | 3/2019 | Witt-Ehsani | G06F 17/2715 |
| 10,339,196 | B2* | 7/2019 | Brown | G06F 17/241 |
| 2004/0153504 | A1* | 8/2004 | Hutchinson | G06Q 10/10 |
| | | | | 709/204 |
| 2006/0253418 | A1* | 11/2006 | Charnock | G06Q 10/10 |
| 2008/0319744 | A1* | 12/2008 | Goldberg | G06Q 10/10 |
| | | | | 704/235 |
| 2009/0006547 | A1* | 1/2009 | Banatwala | G06Q 10/10 |
| | | | | 709/204 |
| 2009/0055186 | A1* | 2/2009 | Lance | G09B 21/006 |
| | | | | 704/260 |
| 2009/0271438 | A1* | 10/2009 | Agapi | G06Q 10/109 |
| 2009/0306981 | A1* | 12/2009 | Cromack | G10L 15/26 |
| | | | | 704/235 |
| 2010/0269071 | A1* | 10/2010 | Bhide | G06Q 10/10 |
| | | | | 715/846 |
| 2014/0019119 | A1* | 1/2014 | Liu | G06F 17/2229 |
| | | | | 704/9 |
| 2015/0012270 | A1* | 1/2015 | Reynolds | G10L 25/84 |
| | | | | 704/233 |
| 2015/0120825 | A1* | 4/2015 | Waxman | H04L 65/403 |
| | | | | 709/204 |
| 2016/0034111 | A1* | 2/2016 | Sahai | G06Q 10/10 |
| | | | | 715/730 |
| 2017/0061987 | A1* | 3/2017 | Kikugawa | G06F 3/04883 |
| 2017/0310716 | A1* | 10/2017 | Lopez Venegas | G06Q 10/1093 |
| 2018/0060289 | A1* | 3/2018 | Grueneberg | G06F 17/241 |
| 2018/0158159 | A1* | 6/2018 | Divine | G06Q 50/184 |

* cited by examiner

SYSTEMS, METHODS, AND COMPUTER-READABLE STORAGE DEVICE FOR GENERATING NOTES FOR A MEETING BASED ON PARTICIPANT ACTIONS AND MACHINE LEARNING

TECHNICAL FIELD

Embodiments of the present disclosure relate generally to capturing audio, visual, and/or other types of data during a meeting and automatically generating notes based on the captured meeting data, predefined participant actions, and machine learning. More specifically, embodiments of the present disclosure relate to capturing relevant moments of a meeting based on one or more meeting participants' actions and/or machine learning, and capturing of participants' actions on captured meeting data to aid in machine learning.

INTRODUCTION

Meetings are a common everyday occurrence for variety of people. Meetings may be informal or formal. Informal meetings may occur anytime and/or at any place. For example, an informal meeting may occur in a random location upon a chance encounter with a colleague. Formal meetings may be more organized and structured. Some meetings may include both informal and formal characteristics.

Further, meeting participants may assemble at one or more locations to discuss one or more predetermined topics and/or casually discuss one or more random topics. Actively listening to a discussion and/or participating in the discussion during a meeting, while simultaneously taking notes, may be a difficult task. Participants to a meeting need to recognize important moments in a conversation, and then jot down notes that incorporate the substance of the moment. However, out of the context of the meeting, such notes may not make sense at a later time. Additionally, while taking notes and/or inadvertently, other important moments of a meeting may also be missed.

With recording technology, entire meetings may be recorded and transcribed. However, it may become tedious to search through a transcription of a meeting to identify important moments. Further, recording, transcribing, and storing data for an entire meeting may increase data storage requirements and may be prohibitive for daily use in business.

While various technologies have been developed with the goal to promote and improve the effectiveness of meetings, there exists a need to provide an improved system to automatically and effectively take notes and/or develop follow-up actions, such as reminders, to-do lists, and/or scheduling future meetings.

SUMMARY OF THE DISCLOSURE

According to certain embodiments, systems, methods, and computer-readable storage devices are disclosed for generating notes for a meeting based on participant actions and machine learning.

According to certain embodiments, a computer-implemented method for generating notes for a meeting based on participant actions and machine learning is disclosed. One method comprising: receiving, over an electronic communications network, meeting data from a plurality of participant devices participating in an online meeting, the meeting data including audio data generated during the online meeting from each participant device of the plurality of participant devices, and the meeting data including a time stamp of when audio of the audio data occurred; continuously generating, by at least one server when receiving meeting data, text data based on the received audio data from each participant device of the plurality of participant devices, the text data being a transcription of audio captured during the online meeting and text data including a time stamp of when the audio corresponding to the text data was captured; iteratively performing the following steps until receiving meeting data for the meeting has ended, the steps including: receiving, from at least a first participant device of the plurality of participant devices during receiving the meeting data, an indication that a predefined action has occurred on the first participating device, the indication including a time stamp in which the predefined action occurred and an first identifier that identifies the first participant device; generating, by the at least one server, a participant segment of the meeting data for at least the first participant device, the participant segment including the first identifier and generated text data from a first predetermined time before the time stamp in which the predefined action occurred to the time stamp in which the predefined action occurred; and determining whether the receiving meeting data of the meeting has ended; and generating, when receiving meeting data for the meeting has ended, a summary of the meeting for the first participant device, the summary including a plurality of generated participant segments including the first identifier of the first participant device.

According to certain embodiments, a system for generating notes for a meeting based on participant actions and machine learning is disclosed. One system including: a data storage device that stores instructions for generating notes for a meeting based on participant actions and machine learning; and a processor configured to execute the instructions to perform a method including: receiving, over an electronic communications network, meeting data from a plurality of participant devices participating in an online meeting, the meeting data including audio data generated during the online meeting from each participant device of the plurality of participant devices, and the meeting data including a time stamp of when audio of the audio data occurred; continuously generating, by at least one server when receiving meeting data, text data based on the received audio data from each participant device of the plurality of participant devices, the text data being a transcription of audio captured during the online meeting and text data including a time stamp of when the audio corresponding to the text data was captured; iteratively performing the following steps until receiving meeting data for the meeting has ended, the steps including: receiving, from at least a first participant device of the plurality of participant devices during receiving the meeting data, an indication that a predefined action has occurred on the first participating device, the indication including a time stamp in which the predefined action occurred and an first identifier that identifies the first participant device; generating, by the at least one server, a participant segment of the meeting data for at least the first participant device, the participant segment including the first identifier and generated text data from a first predetermined time before the time stamp in which the predefined action occurred to the time stamp in which the predefined action occurred; and determining whether the receiving meeting data of the meeting has ended; and generating, when receiving meeting data for the meeting has ended, a summary of the meeting for the first participant device, the summary including a plurality of generated participant segments including the first identifier of the first participant device.

According to certain embodiments, a computer-readable storage device storing instructions that, when executed by a computer, cause the computer to perform a method for generating notes for a meeting based on participant actions and machine learning is disclosed. One method of the computer-readable storage devices including: receiving, over an electronic communications network, meeting data from a plurality of participant devices participating in an online meeting, the meeting data including audio data generated during the online meeting from each participant device of the plurality of participant devices, and the meeting data including a time stamp of when audio of the audio data occurred; continuously generating, by at least one server when receiving meeting data, text data based on the received audio data from each participant device of the plurality of participant devices, the text data being a transcription of audio captured during the online meeting and text data including a time stamp of when the audio corresponding to the text data was captured; iteratively performing the following steps until receiving meeting data for the meeting has ended, the steps including: receiving, from at least a first participant device of the plurality of participant devices during receiving the meeting data, an indication that a predefined action has occurred on the first participating device, the indication including a time stamp in which the predefined action occurred and an first identifier that identifies the first participant device; generating, by the at least one server, a participant segment of the meeting data for at least the first participant device, the participant segment including the first identifier and generated text data from a first predetermined time before the time stamp in which the predefined action occurred to the time stamp in which the predefined action occurred; and determining whether the receiving meeting data of the meeting has ended; and generating, when receiving meeting data for the meeting has ended, a summary of the meeting for the first participant device, the summary including a plurality of generated participant segments including the first identifier of the first participant device.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

Figure 1:
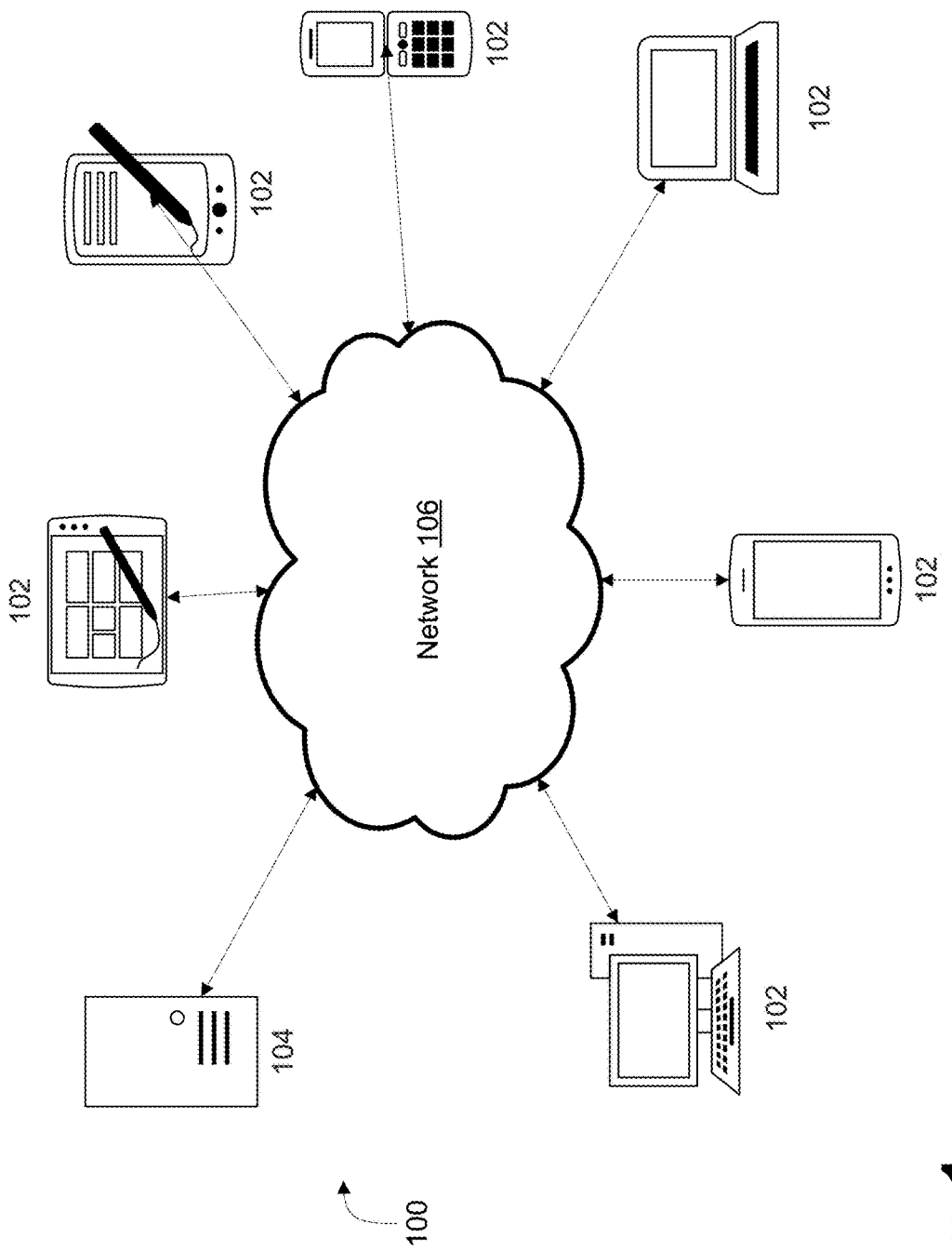
FIG. 1 depicts a block diagram of an exemplary computer network environment for generating notes for a meeting based on participant actions and machine learning, according to embodiments of the present disclosure.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF THE EMBODIMENTS

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." Additionally, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

For the sake of brevity, conventional techniques related to systems and servers used to conduct methods and other functional aspects of the systems and servers (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure generally relates to, among other things, generating notes for a meeting based on participant actions and machine learning. More specifically, the disclosure relates to automatically capturing information from audio data and generating meeting notes and/or a meeting summary based on at least one of a meeting participant's actions and/or machine learning, and the disclosure relates to capturing of actions, such as, for example, corrections to the generated meeting notes, that a participant may make upon receiving the generated meeting notes, which may be used to improve machine learning. Benefits of the present disclosure include, among other things, improved transcription and extraction of text data from audio data, and/or improved machine learning recognizing of relevant keywords and/or phrases from text data.

According to embodiments of the disclosure, during a computer-recorded meeting, a participant device of a participant attending the meeting and/or a server recording the meeting may receive meeting data, including at least audio data of the meeting. The participant device and/or the server may receive a predefined action and/or an indication that the predefined action has occurred. The predefined action may include one or more of a participant and/or a host clicking and/or tapping a physical button associated with the participant device and/or a button displayed on a display screen of the participant device, a participant and/or a host performing a predetermined gesture, such as a wave of a hand and/or raising a hand, a participant and/or a host speaking a predetermined word and/or phrase, such as "record," "save," "remember," "memory," "moment," and/or a participant and/or a host requesting a virtual assistant, such as Siri, Alexa, Cortana, and/or Google Assistant, to "record," "save," "remember," capture a "memory," capture a "moment," etc. of the meeting.

In response to the predefined action occurring, a segment of the meeting may be generated. The generated segment of the meeting may include one or more of audio data, video data, text data, etc. that is captured during the meeting. The generated segment may include meeting data from a predetermined amount of time before the predefined action occurred to when the predefined action occurred. Alternatively, the generated segment may include meeting data from a first predetermined amount of time before the predefined action occurred to a second predetermined amount of time after the predefined action occurred, where the first and second predetermined amount of times may be the same amount of time or a different amount of time. Alternatively, the generated segment may include meeting data from when the predefined action occurred to a predetermined amount of time after the predefined action occurred.

For example, when a meeting participant says "Cortana, record moment," the participant device and/or the server may capture and/or generate a segment of meeting data from 5 seconds, 10 seconds, 15 seconds, 30 seconds, 60 seconds, and/or any predefined amount of time before and/or after the meeting participant says "Cortana, record moment." In one embodiment of the present disclosure, the segment may include meeting data from 20 seconds before the predefined action occurred to 10 seconds after the predefined action occurred.

Accordingly, each participant and/or a host of the meeting may generated segments during the meeting based on their respective preferences. The generated segments may include at least transcriptions of audio data captured during a predetermined time around the predefined action for each respective meeting participant and/or host, as mentioned above. The generated segments may also include audio data, video data, and/or other data of the meeting captured during the predetermined time around the predefined action for each respective meeting participant and/or host. For example, the segments may include the audio data, text data generated from the audio data, and/or any additional data captured during the predetermined time around the predefined action. Additional data may include video data, images of presentations, images of documents, etc. that were presented in the meeting during the predetermined time around the predefined action.

During the meeting and/or after the conclusion of the meeting, a report and/or a summary for the meeting may be generated including each generated segment of the meeting from each participant in the meeting. For example, the generated segments may be one or more of transmitted to each of the participants of the meeting, transmitted to the particular participant that record the segment, and/or transmitted to the host of the meeting.

Further, during the meeting and/or after the meeting, keywords and/or phrases may be extracted from the text data of each generated segment. In one embodiment of the present disclosure, the entire text data generated from the audio data of the meeting may be searched for the extracted keywords and/or phrases to determine whether the keywords and/or phrases were used during the meeting in sections of the text data where segments were not generated. When a section of the generated text data is determined to include the extracted keywords and/or phrases and a segment has not been generated including the text data having the extracted keywords and/or phrases, new segments may be machine generated without a predefined action occurring by a participant.

Additionally, and/or alternatively, when a first generated segment for a first participant has text data that overlaps text data of a second generated segment of a second participant, a point of interest counter may be incremented. The point of interest counter may indicate that a plurality of participants of the meeting indicated that a particular moment of the meeting is of interest and/or important. When a plurality of participants of the meeting generate segments with overlapping text data, higher ranking keywords and/or phrases may be extracted from the text data of overlapping text data, and the text data of the meeting may be searched for the extracted higher ranking keywords and/or phrases to determine whether the higher ranking keywords and/or phrases were used in other sections of the text data of the meeting. When generated text data is determined to include the extracted higher ranking keywords and/or phrases, new segments may be machine generated without the predefined action occurring by a user.

In an embodiment of the present disclosure, during the meeting and/or after the meeting, the text data of the meeting may be searched for predetermined time-based keywords and/or phrases. For example, predetermined time-based keywords and/or phrases may include words for times and/or dates, such as "Monday," "Tuesday," "next week," "next month," "10 AM" etc. The predetermined time-based keywords and/or phrases may be used to generated time-based segments for a predetermined time around where the predetermined time-based keywords and/or phrases is found. Further, follow-up actions for the meeting may be generated, such as generating calendar invites and/or generating a reminder based on the extracted predetermined time-based keywords and/or phrases.

In another embodiment of the present disclosure, the text data of the meeting may be searched for predetermined emphasis keywords and/or phrases, such as "emphasize," "important," "homework," "follow-up," "action item," "remember," etc. The predetermined emphasis keywords and/or phrases may be used to generated emphasis segments for a predetermined time around where the predetermined emphasis keywords and/or phrases is found.

In yet another embodiment of the present disclosure, one or more of extracted keywords and/or phrases, extracted higher ranking keywords and/or phrases, predetermined time-based keywords and/or phrases, and/or predetermined emphasis keywords and/or phrases used and/or extracted from text data of other meetings may be used in a current meeting to generate segments.

In one embodiment of the present disclosure, the report and/or summary may include one or more of the text data of the segment generated by the participant, the extracted keywords and/or phrases of the segment generated by the participant, text data of the segment generated by machine learning, and/or extracted keywords and/or phrases of the segment generated by machine learning.

Based the extracted keywords and/or phrases, other computer programs on a participant device may be executed to perform an action. For example, a mail message, a calendar event, a task, a to do item, a text document, etc. may be populated with text data of a segment including the extracted keywords and/or phrases based on the extracted keywords and/or phrases. For example, a calendar event may be generated with a date and a time completed from the extracted keywords and/or phrases. Further, a note and/or other item of information, such as a document, may be populated with text data of a segment including the extracted keywords and/or phrases based on the extracted keywords and/or phrases.

FIG. 1 depicts a block diagram of an exemplary computer network environment for generating notes for a meeting based on participant actions and machine learning, according to embodiments of the present disclosure. Computer network environment 100 may include a plurality of participant devices 102 and at least one server 104 connected via an electronic communications network 106. For example, participant devices 102, as described in more detail below, may be one or more of a computer, a tablet computer, a laptop computer, a mobile device, a smartphone, a personal data assistant ("PDA"), etc. Those skilled in the art will understand that any number of nodes, devices, links, etc. may be used in the electronic communications network 106, and that the view shown herein is for simplicity.

Figure 2:
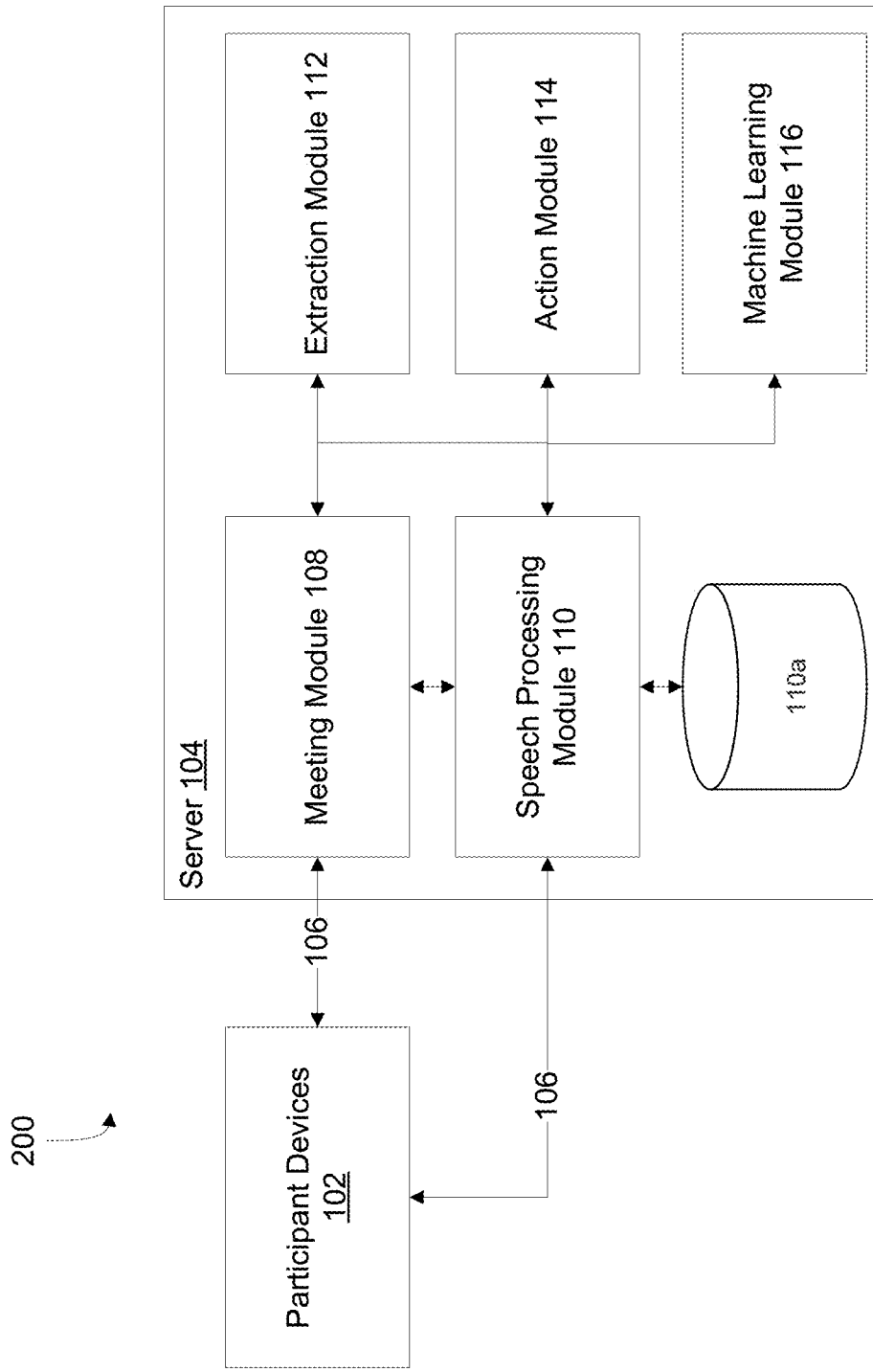
FIG. 2 depicts a block diagram of exemplary systems for generating notes for a meeting based on participant actions and machine learning, according to embodiments of the present disclosure.

FIG. 2 depicts a block diagram of exemplary systems 200 for generating notes for a meeting based on participant actions and machine learning, according to embodiments of the present disclosure. The at least one server 104 may include meeting module 108 having a first input that receives the audio data from the plurality of participant devices 102 and/or from an audio capture device (not shown) connected directly or indirectly to the at least one server 104. The meeting module 108 may include a second input that receives an indication that a predefined action has occurred on one or more of the plurality of participant devices. Each indication may include a time stamp for when the predefined action occurred on a particular participant device of the plurality of participant devices and an identifier for the participant device of the plurality of participant devices on which the predefine action occurred.

The meeting module 108 may output that is indicative of a predefined action by the particular participant device has been detected and audio data is being received from the plurality of participant devices. The receiving of audio data and a predefined action indicates, to other modules of the at least one server 106, whether those modules may begin processing on the audio data of the meeting and processing on data related to the audio data. The receiving of audio data from the plurality of devices may indicate that a meeting is occurring. Additionally, the meeting module 108 processes the received indication that the predefined action occurred on one or more of the plurality of participant devices, and may determine which participant device of the plurality of participant devices received the predefined action from a participant.

The at least one server 104 may also include a speech processing module 110 having a first input that may receive the audio data from the plurality of participant devices, and a second input that may receive the predefined action has been detected by the meeting module 108. In response to receiving the audio data of the plurality of participant devices 102, the speech processing module 110 processes the audio data.

In one embodiment of the present disclosure, the speech processing module 110 may output a sequence of text data, such as words and phrases, for all of the audio data received from each of the plurality of devices 102 and store the data in a speech-to-text database 110a. For example, the speech processing module 110 may convert all of the audio data of the meeting into text data, and may store the text data of the meeting in the speech-to-text database 110a for later access and further processing. A variety of speech recognition technologies may be used to implement the speech processing module 110.

Additionally, and/or alternative, the speech processing module 110 may convert the audio data of the meeting into text data when the meeting module 108 provides the indication that the predefined action has occurred, and may store in the speech-to-text database 110a a portion of the text data that occurs a predefined amount of time before and/or after the predefined action is detected. Additionally, or alternatively, the speech-to-text database 110*a* may store the audio data received from each of the plurality of devices 102. The stored audio data received from each of the plurality of devices 102 may then be used for further processing, as discussed in detail below. In one embodiment of the present disclosure, the audio data and/or the text data stored in the speech-to-text database 110*a* may be time stamped. Additionally, and/or alternatively, the text data may be provided to one or more other modules for further processing by being stored in a data file and/or by being stored temporarily in memory.

An extraction module 112 may receive the text data from the speech processing module 110. The pattern detection module 112 may process the text data using text filters that defines a keyword and/or phrase in text data when the meeting module 108 provides the indication that the predefined action associated with one or more of the plurality of participant devices has occurred. Keywords and/or phrases may include, for example, tasks to be performed, follow-up appointments and other events, messages to be sent, important points or notes, and the like. Keywords and/or phrases may be defined, for example, using a syntactical representation such as a rule or other data structure that may be interpreted by the extraction module 112. In an embodiment of the present disclosure, the extraction module 112 may count a number of occurrences of the keywords and/or phrases in the text data.

An action module 114 may be configured to receive the text data from the speech processing module 110 and/or the keywords and/or phrases from the extraction module 112. Based on one of more of the text data and/or keywords and/or phrases action may be generated. For example, action may include generating a calendar event, a task, a message, a note, and the like. The action module 114 may include various graphical user interface features that allow a participant and/or a host to view and manipulate the participant's own input in combination with the text data, keywords, and/or phrases. For example, the action module 114 may correlate a predefined action of the participant device, received text data, and received extracted keywords and/or phrases by their respective time stamps.

The at least one server 104 may also include a machine learning module 116. The machine learning module may execute as an on-going process on the at least one server 104 in conjunction with the speech processing module 110 converting the audio data of the meeting into text data. In contrast to the extraction module 112, the machine learning module 116 may be a machine learning component that analyzes the behavior of the participant with regard to the participant's actions and may make suggestions and/or may make automatic actions for the participant in regard to the learned information. As those skilled in the art will appreciate, machine learning may be conducted in regard to a model (i.e., modeling the behavior of participants and/or a host of the meeting) and may include at least three phases: model creation, model validation, and model utilization, though these phases may not be mutually exclusive. As discussed in more detail below, model creation, validation and utilization may be on-going processes of a machine learning process as conducted by the machine learning module 116.

For the machine learning module 116, the model creation phase may involve identifying information that is viewed as being important to one or more participants and/or the host of the meeting. The machine learning module 116 may monitor the ongoing audio data and/or text data to detect segments, notes, and/or other data in the audio data and/or text data of the meeting that appears to cause one or more participants and/or the host of the meeting to capture a note from the audio of the meeting. A segment, note, and/or other data may correspond to the detection of a particular word or phrase in the meeting data. Segments, notes, and/or other data may be based on numerous and varied conditions that are substantially more complex than word detection. Segments, notes, and/or other data may comprise conditions based on logic and operators combined in various manners with detected patterns of speech, speed of speech, tone of speech, volume, the particular speaker, the relationship of one word or phrase with regard to another, timing of words, parts of speech used, and the like. By way of illustration and not limitation, a segment, note, and/or other data may comprise the detection of conditions such as: phrase P occurring within two words after word W by speaker S. Another non-limiting example may comprise the conditions of: word W used as part of speech A within phrase P.

As those skilled in the art will appreciate, these segments, notes, and/or other data may be derived from statistical analysis and machine learning techniques on large quantities of data collected over time, based on patterns such as tone and speed of speech as well as observed behavior (with regard to capturing notes, annotating notes with categories, assigning notes to persons, etc., to create the machine learning model. Based on the observations of this monitoring, the machine learning module 116 may create a model (i.e., a set of rules or heuristics) for capturing notes and/or conducting activities with regard to meeting data.

During a second phase of machine learning, the model created during the model creation phase may be validated for accuracy. During this phase, the machine learning module 116 may monitor a participant's behavior with regard to actions taken during the meeting and compares those actions against predicted actions made by the model. Through continued tracking and comparison of this information and over a period of time, the machine learning module 116 may determine whether the model accurately predicts which parts of the content stream are likely to be captured as notes by a participant of the meeting using various actions. This validation is typically expressed in terms of accuracy: i.e., what percentage of the time does the model predict the actions of a participant. Information regarding the success or failure of the predictions by the model may be fed back to the model creation phase to improve the model and, thereby, improve the accuracy of the model.

The third phase of machine learning may be based on a model that is validated to a predetermined threshold degree of accuracy. For example, a model that is determined to have at least a 50% accuracy rate may be suitable for the utilization phase. According to embodiments of the present disclosure, during this third, utilization phase, the machine learning module 116 may listen to the audio data and/or read text data, track and identify parts of the audio data and/or text data where the model suggests that a participant may take an action. Upon encountering segments, notes, and/or other data in the audio data and/or text data in which the model suggests that a participant would take action/activity, the contents of the audio data and/or text data and/or various activities and actions that might be associated with a note from the audio data and/or text data, may be temporarily stored as segments. The temporarily stored segments may later presented to one or more participants and/or the host of the meeting at the end of a meeting as suggestions. Of course, information based on the confirmation or rejection of the various suggestions by the one or more participants and/or the host may be returned back to the previous two phases (validation and creation) as data to be used to refine the model in order to increase the model's accuracy for the one or more participants and/or the host. The one or more participants and/or the host may further confirm various suggestions as actions to be taken such that the action is automatically taken without any additional input or confirmation.

The computer network environment 100 of FIG. 1 may be implemented using one or more computers, such as described below in FIGS. 8 and 9. There are a variety of deployments where a first computer, such as a computer used by an individual participating in a meeting, includes at least the action module 114. Other parts of the computer network environment may reside on one or more other computers, such as server computers with which the participant's computer communicates over an electronic communications network to which the servers and the participant's computer are connected.

In one exemplary embodiment, the meeting module and action module may reside on a first computer. When the meeting module detects a predefined action, the meeting module may transfer audio data captured before and after the predefined action to at least one second computer. The second computer includes the speech processing module and extraction module and returns results to the first computer. In another exemplary embodiment, all of the modules of FIG. 2 may reside on a single computer, and audio data may be captured by the single computer. Additionally, the single computer may receive the predefined action from a plurality of participants via an audio capture device connected to the single computer. In yet another exemplary environment, the action module 114 may reside on a first computer. The remaining modules may reside on one or more second computers, such as servers with which the participants devices communicates over an electronics communication network to which the servers and the participant's device are connected.

During and/or after the meeting, a report and/or summary of the generated segments from the online meeting may be generated based on all of the generated segments and/or segments generated for a particular participant device. The summary may be transmitted to each participant device and/or only to a participant device of a host of the meeting. Further the summary may be made accessible to one or more of anyone, only participants of the meeting, a limited number of participants of the meeting, and only the host of the meeting. Additionally, each participant of the meeting may have a participant summary that only includes segments generated by the particular participant device.

In one embodiment of the present disclosure, participants may receive transcriptions of audio data and the corresponding audio data. Participants may listen to the corresponding audio data and compare the corresponding audio data to the transcriptions of audio data. For example, a participant may click on a word of the transcription of audio data, and audio data from the clicked word may be played. Participants may edit and/or confirm a portion and/or all of the transcription of audio data. Further, participants may highlight a portion and/or all of the transcription of audio data, and use the highlighted portion to create an action item and/or follow-up action.

Further, the participant's confirming, editing, and/or other interactions with the transcriptions of audio data and/or corresponding audio data may be captured and used as feedback to machine learning. From this, machine learning may suggest a machine learned action item by extracting a transcription of audio data, which a participant and/or other user may confirm and/or modify. Once a participant has confirmed, edited, and/or highlight portions and/or all of the transcription of audio data, their participant device may synchronize the confirmation, edits, and/or highlights with the server and/or other client devices.

Figure 3:
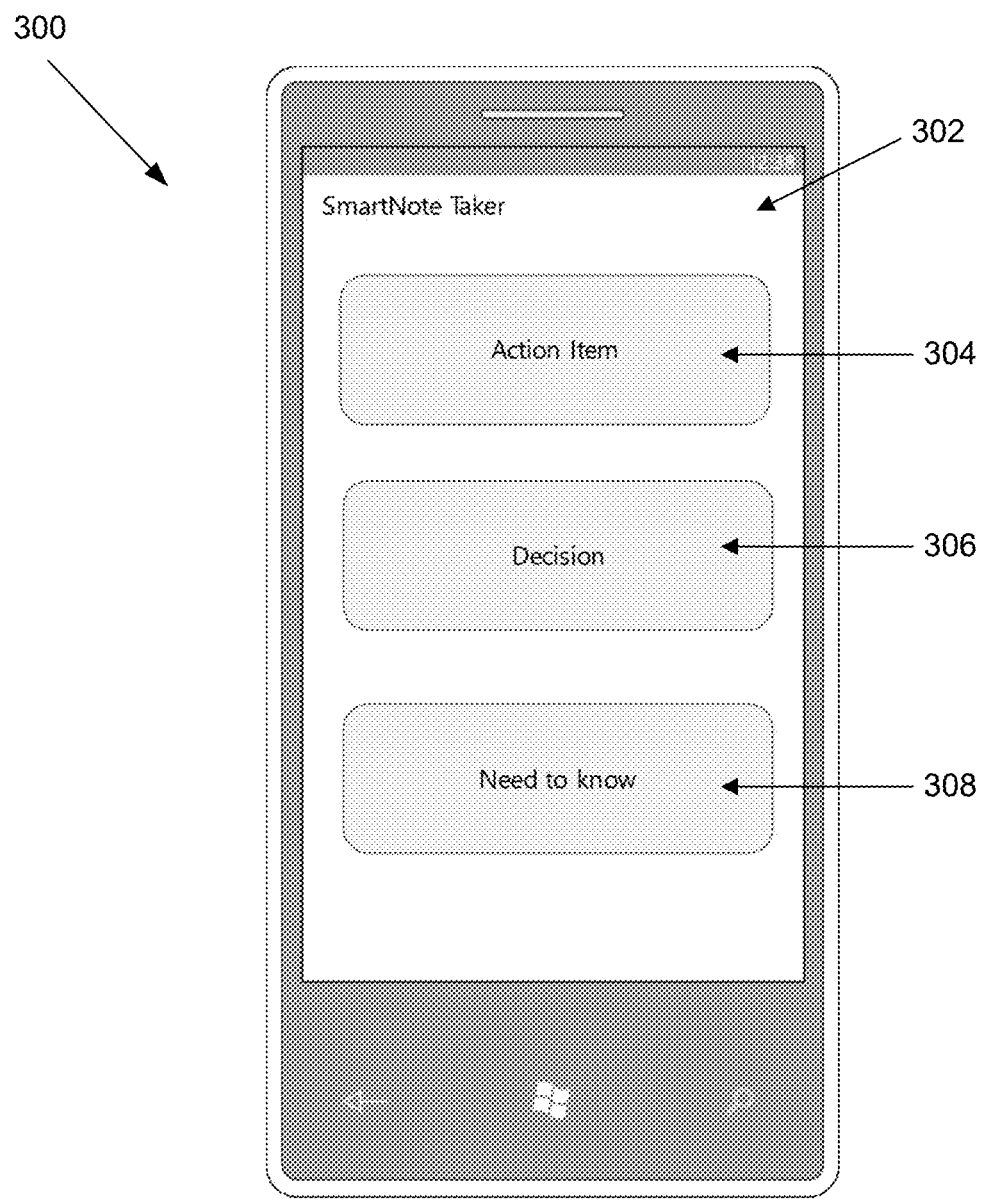
FIG. 3 depicts an exemplary display of a participant device displayed during playing and/or recording meeting data including audio data for an online meeting, according to embodiments of the present disclosure.

FIG. 3 depicts an exemplary display of a participant device displayed during playing and/or recording meeting data including audio data for an online meeting, according to embodiments of the present disclosure. As shown in FIG. 3, a participant device 300 may include a display 302 that displays a plurality of predefined actions 304-308 that a participant may select during playing and/or recording meeting data including audio data for an online meeting. For example, a participant may hear a portion of audio that includes a time and/or date for a follow-up online meeting. When the participant hears the and/or date for the follow-up online meeting, the participant may select a predefined action for action item 304. Additionally, the participant may hear a portion of audio that includes a question that needs to be answered and/or a decision that needs to be made. When the participant hears the question that needs to be answered and/or the decision that needs to be made, the participant may select a predefined action for decision 306. Further, the participant may hear a portion of audio that includes an important topic and/or a discussion to remember. When the participant hears the important topic and/or a discussion to remember, the participant may select a predefined action for need to know 308.

In response to the section of the predefined action on the display 302 of the participant device 300, a segment of the meeting may be generated. The generated segment of the meeting may include one or more of audio data, video data, text data, a selection type of a predefined action, etc. that is captured. The generated segment may include meeting data from a predetermined amount of time before the predefined action occurred to when the predefined action occurred. Alternatively, the generated segment may include meeting data from a first predetermined amount of time before the predefined action occurred to a second predetermined amount of time after the predefined action occurred, where the first and second predetermined amount of times may be the same amount of time or a different amount of time. Alternatively, the generated segment may include meeting data from when the predefined action occurred to a predetermined amount of time after the predefined action occurred.

Figure 4:
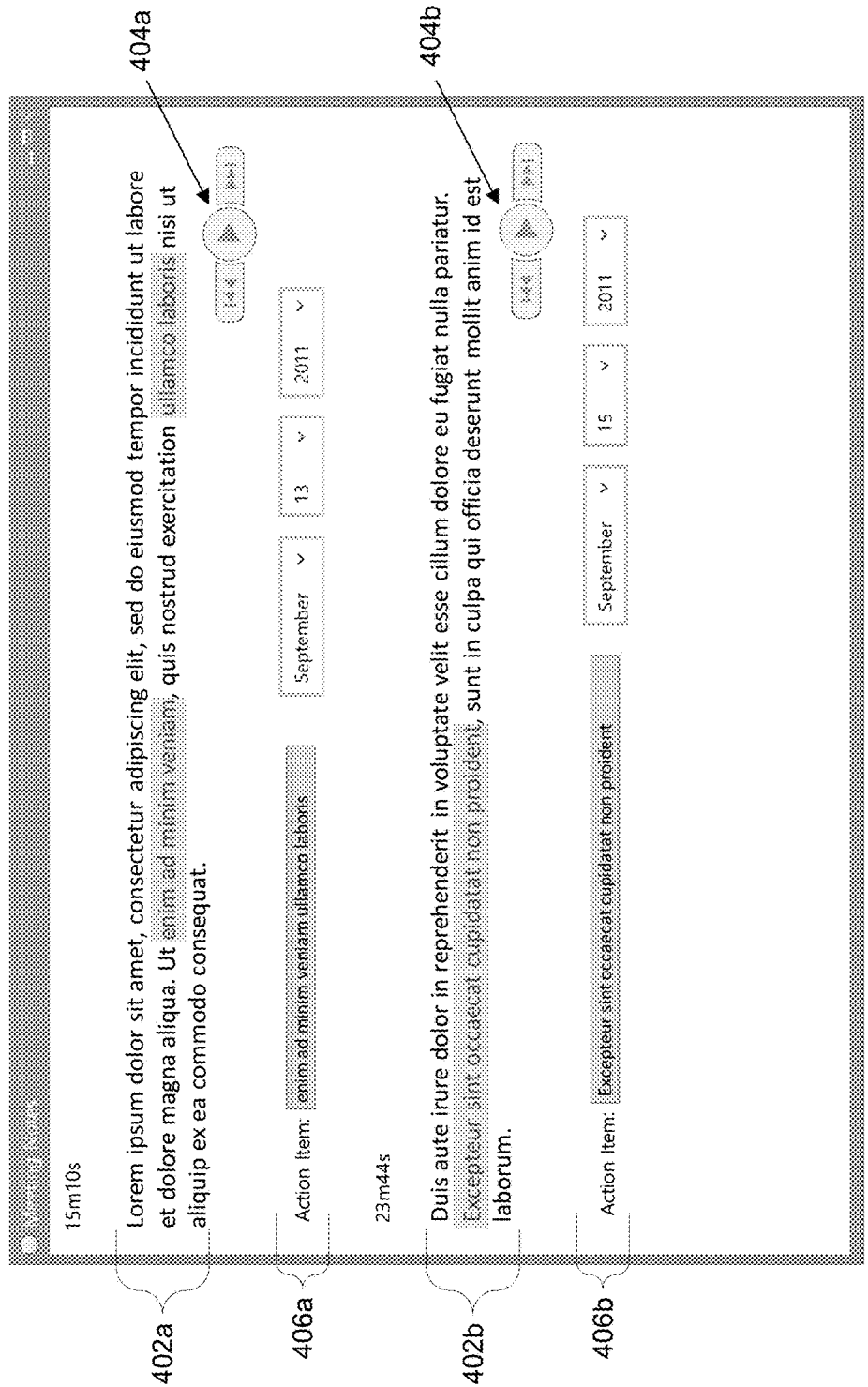
FIG. 4 depicts an exemplary display of a participant device displayed during editing and/or confirming a portion and/or all of the transcription of audio data of an online meeting, according to embodiments of the present disclosure.

FIG. 4 depicts an exemplary display of a participant device displayed during editing and/or confirming a portion and/or all of the transcription of audio data of an online meeting, according to embodiments of the present disclosure. As shown in FIG. 4, a participant device may display text data 402a, 402b a plurality of segments, the text data being transcriptions of audio data. Audio data 404a, 404b, that corresponds to the displayed text data 402a, 402b, may be played by the participant in order to confirm and/or edit the transcription. Also, depending on the selection type of the predefined action of the segment, the participant may define an action item 406a, 406b, such as a follow-up up action for a time and/or date set by the participant and/or by the transcription.

For example, participants may receive transcriptions of audio data and the corresponding audio data. Participants may listen to the corresponding audio data and compare the corresponding audio data to the transcriptions of audio data. For example, a participant may click on a word of the transcription of audio data, and audio data from the clicked word may be played. Participants may edit and/or confirm a portion and/or all of the transcription of audio data. Further, participants may highlight a portion and/or all of the transcription of audio data, and use the highlighted portion to create an action item and/or follow-up action.

Figure 5:
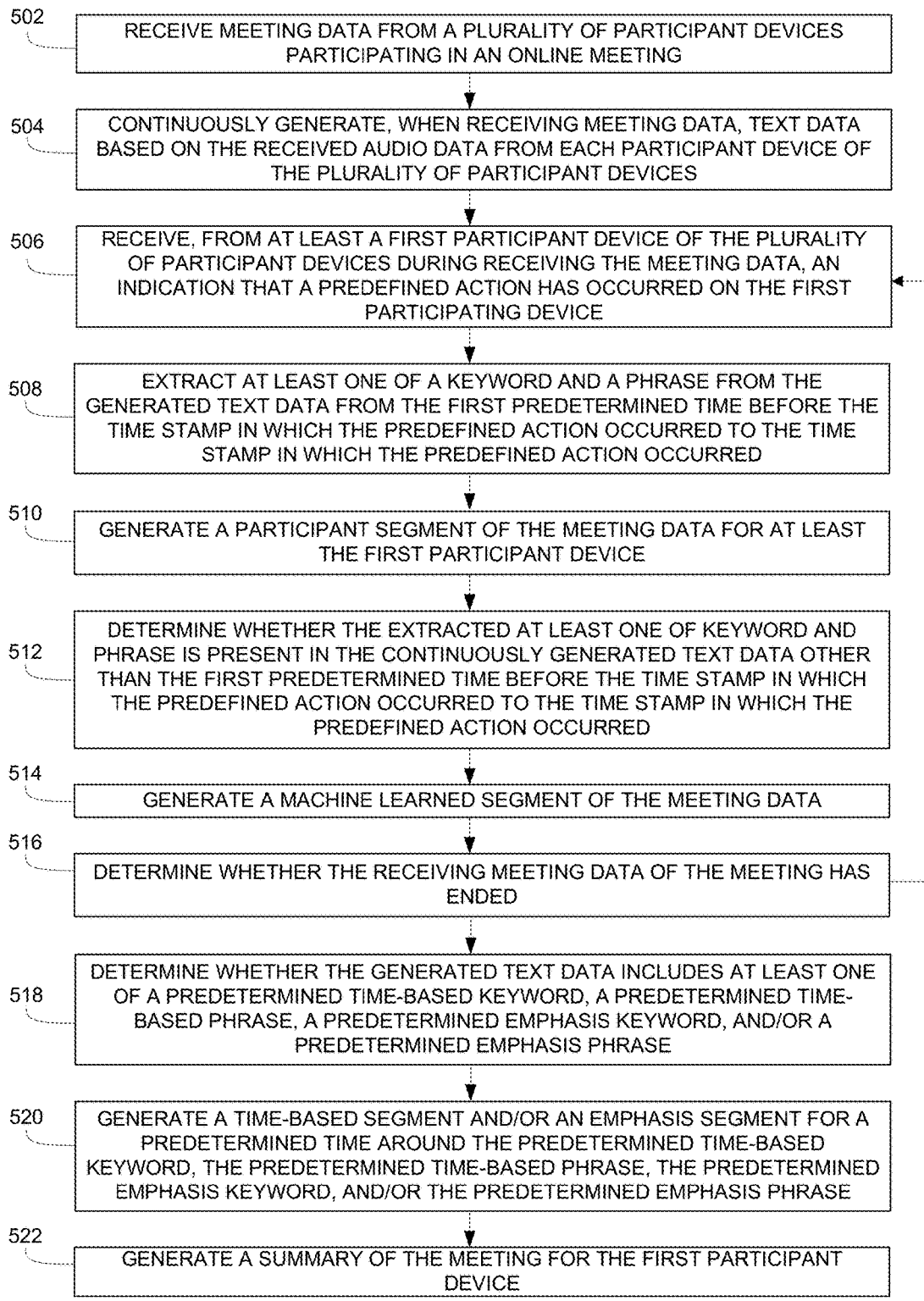
FIG. 5 depicts a method for generating notes for a meeting based on participant actions and machine learning, according to embodiments of the present disclosure.
Figure 6:
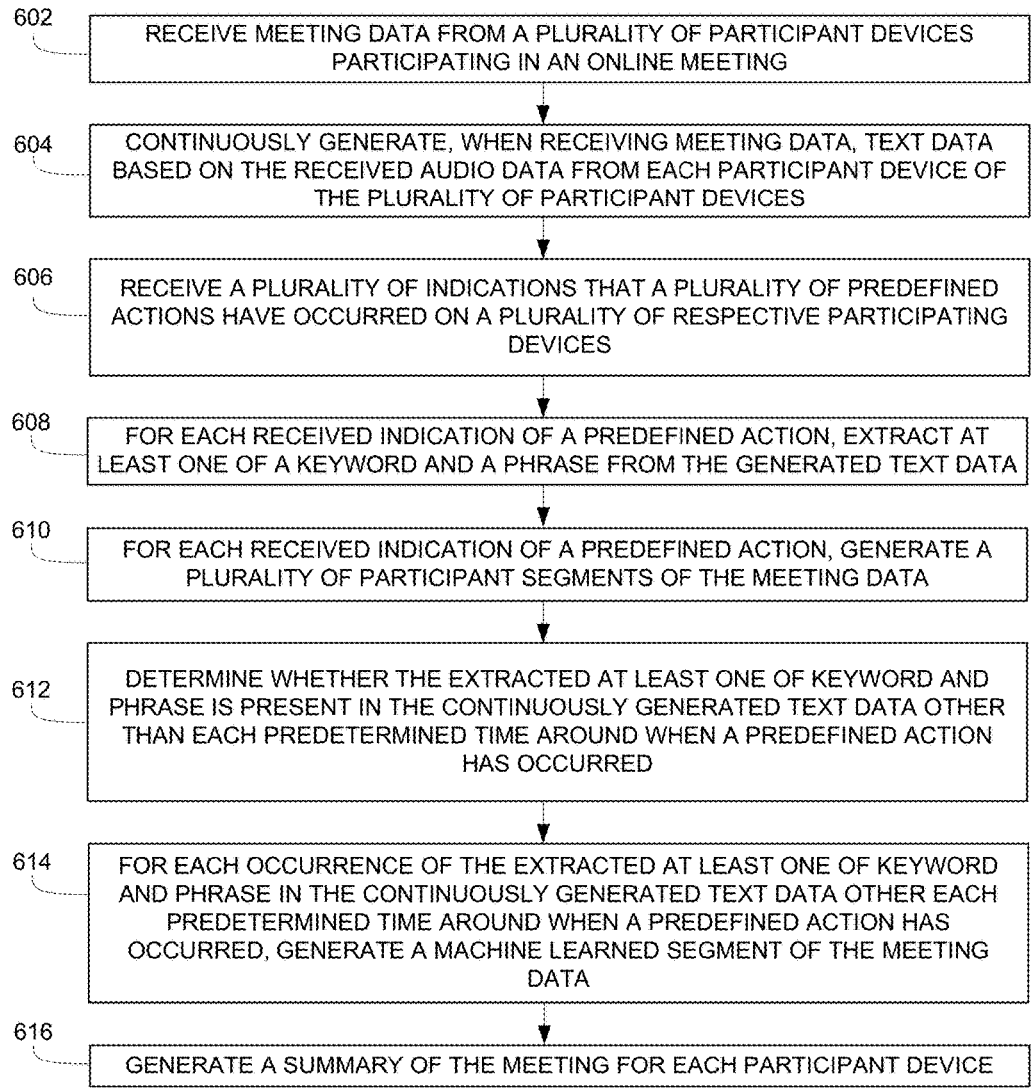
FIG. 6 depicts another method for generating notes for a meeting based on participant actions and machine learning, according to embodiments of the present disclosure.
Figure 7:
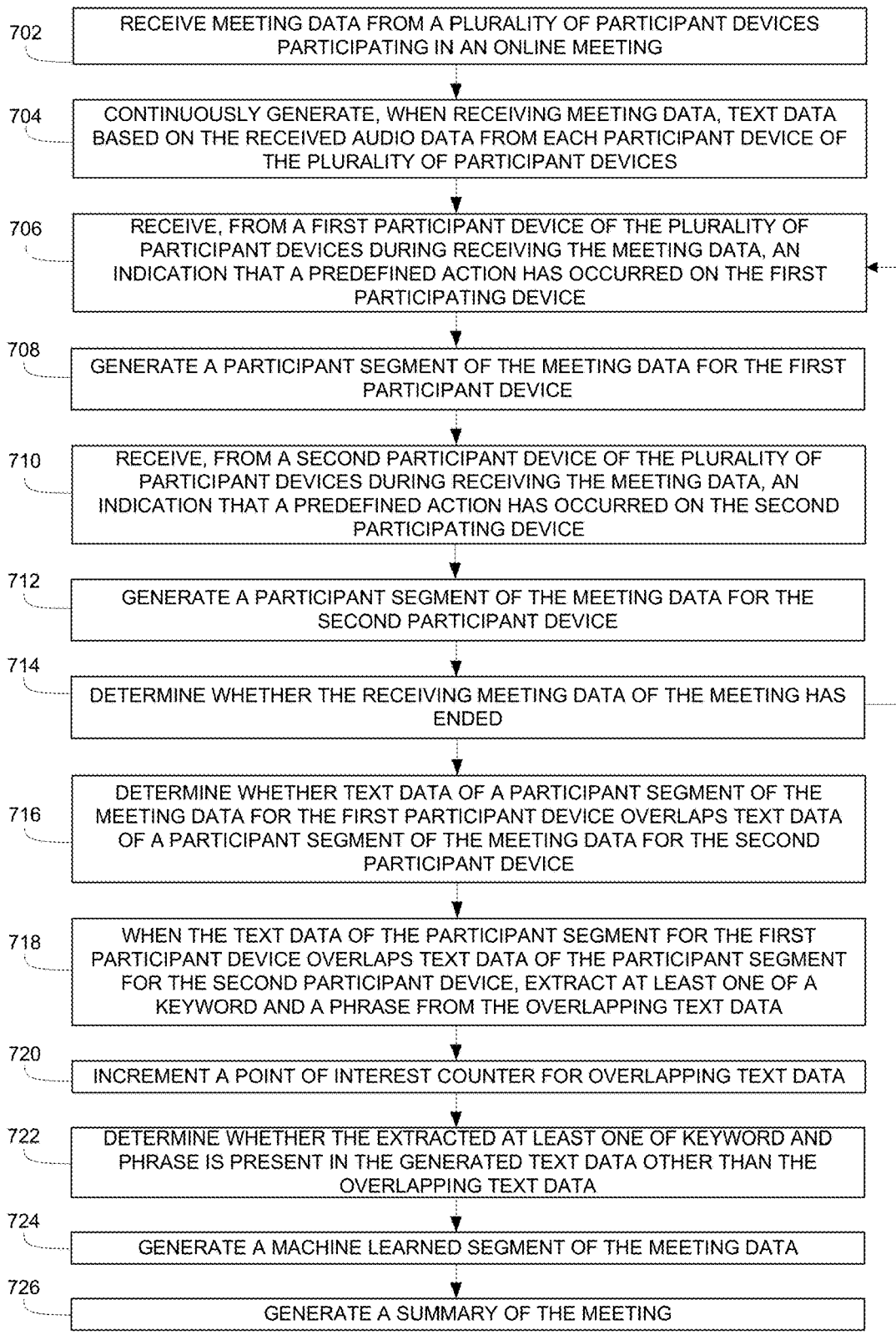
FIG. 7 depicts yet another method for generating notes for a meeting based on participant actions and machine learning, according to embodiments of the present disclosure.

FIGS. 5-7 depict exemplary methods for generating notes for a meeting based on participant actions and machine learning, according to embodiments of the present disclosure. While the methods are shown and described as being a series of acts that are performed in a sequence, it is to be understood and appreciated that the methods are not limited by the order of the sequence. For example, some acts may occur in a different order than what is described herein. In addition, an act may occur concurrently with another act. Further, in some embodiments, not all acts may be required to implement methods described herein.

Moreover, the acts described herein may be computer-executable instructions that may be implemented by one or more processors and/or stored on a non-transitory computer-readable medium or media. The computer-executable instructions may include a routine, a module, a sub-routine, programs, a thread of execution, and/or the like. Still further, results of acts of the methods may be stored in a non-transitory computer-readable medium, displayed on a display device, and/or the like.

FIG. 5 depicts a method 500 for generating notes for a meeting based on participant actions and machine learning, according to embodiments of the present disclosure. Method 500 may begin at step 502 where meeting data from a plurality of participant devices participating in an online meeting may be received. The meeting data may include audio data generated during the online meeting from each participant device of the plurality of participant devices, and the meeting data may include a time stamp of when audio of the audio data occurred. Further, the meeting data may also include video data, images of presentations, images of documents, etc. that are presented during the online meeting At step 504, the method may continuously generate, when receiving meeting data, text data based on the received audio data from each participant device of the plurality of participant devices. The text data may be a transcription of audio captured during the online meeting and text data may include a time stamp of when the audio corresponding to the text data was captured.

At step 506, the method may iteratively perform the following steps until receiving meeting data for the meeting has ended. One step may include receiving, from at least a first participant device of the plurality of participant devices during receiving the meeting data, an indication that a predefined action has occurred on the first participating device, the indication including a time stamp in which the predefined action occurred and an first identifier that identifies the first participant device. The predefined action includes one or more of a participant clicking a physical button associated with the first participant device of the participant, a participant clicking a button displayed on a display screen of the first participant device of the participant, a participant performing a predetermined gesture, a participant speaking a predetermined word and/or phrase, and/or a participant requesting a virtual assistant generated a note for the online meeting.

The method may then proceed to step 508 where at least one of a keyword and a phrase may be extracted from the generated text data from the first predetermined time before the time stamp in which the predefined action occurred to the time stamp in which the predefined action occurred.

Upon receiving the indication, at step 510, a participant segment of the meeting data for at least the first participant device may be generated. The participant segment may include the first identifier and generated text data from a first predetermined time before the time stamp in which the predefined action occurred to the time stamp in which the predefined action occurred. Each participant segment may include at least transcriptions of audio data captured during a predetermined time around the predefined action for each respective meeting participant and/or host, as mentioned above. Additionally, or alternatively, the generated participant segment may include the generated text data from the first predetermined time before the time stamp in which the predefined action occurred to a second predetermined amount of time after the predefined action occurred, wherein the first predetermined amount of time and second predetermined amount of time are one of a same amount of time and a different amount of time. Further, the participant segment may include the extracted at least one of keyword and phrase.

The participant segments may also include audio data, video data, and/or other data of the meeting captured during the predetermined time around the predefined action for each respective meeting participant and/or host. For example, the participant segments may include the audio data, text data generated from the audio data, and/or any additional data captured during the predetermined time around the predefined action. Additional data may include video data, images of presentations, images of documents, etc. that were presented in the meeting during the predetermined time around the predefined action.

Then, at step 512, the extracted at least one of keyword and phrase may be used to determine whether the extracted at least one of keyword and phrase is present in the continuously generated text data other than the first predetermined time before the time stamp in which the predefined action occurred to the time stamp in which the predefined action occurred.

For each occurrence of the extracted at least one of keyword and phrase in the continuously generated text data other than the first predetermined time before the time stamp in which the predefined action occurred to the time stamp in which the predefined action occurred, a machine learned segment of the meeting data may be generated at step 514. The machine learned segment may include generated text data from a first predetermined time before the occurrence of the extracted at least one of keyword and phrase to a time of occurrence of the extracted at least one of keyword and phrase.

The method then proceeds to step 516 where it is determined whether the receiving meeting data of the meeting has ended. In other words, it is determined whether the online meeting has completed and/or ended.

When receiving meeting data for the meeting has ended, at step 518, it may be determined whether the generated text data includes at least one of a predetermined time-based keyword, a predetermined time-based phrase, a predetermined emphasis keyword, and/or a predetermined emphasis phrase.

When the generated text data includes the at least one of the predetermined time-based keyword, the predetermined time-based phrase, the predetermined emphasis keyword, and/or the predetermined emphasis phrase, a time-based segment and/or an emphasis segment for a predetermined time around the predetermined time-based keyword, the predetermined time-based phrase, the predetermined emphasis keyword, and/or the predetermined emphasis phrase may be generated at step 520. The time-based segment may include the generated text data from the predetermined time around the at least one of the predetermined time-based keyword and the predetermined time-based phrase. Further, for each time-based segment, a follow-up action, the follow-up action including one or more of a calendar invite and a reminder based on the generated text data of the time-based segment may be generated.

When receiving meeting data for the meeting has ended, a summary of the meeting for the first participant device may be generated at step 522. The summary may include a plurality of generated participant segments including the first identifier of the first participant device. Additionally, the summary may include one or more machine learned segments and/or the emphasis segments.

FIG. 6 depicts a method 600 for generating notes for a meeting based on participant actions and machine learning, according to embodiments of the present disclosure. Method 600 may begin at step 602 where meeting data from a plurality of participant devices participating in an online meeting may be received. The meeting data may include audio data generated during the online meeting from each participant device of the plurality of participant devices, and the meeting data may include a time stamp of when audio of the audio data occurred. Further, the meeting data may also include video data, images of presentations, images of documents, etc. that are presented during the online meeting At step 604, the method may continuously generate, when receiving meeting data, text data based on the received audio data from each participant device of the plurality of participant devices. The text data may be a transcription of audio captured during the online meeting and text data may include a time stamp of when the audio corresponding to the text data was captured.

At step 606, the method may receive a plurality of indications that a plurality of predefined actions have occurred on a plurality of respective participating devices, each indication including a time stamp in which the predefined action occurred and an identifier that identifies a particular participant device of the plurality of participant devices. The predefined actions may include one or more of a participant clicking a physical button associated with the first participant device of the participant, a participant clicking a button displayed on a display screen of the first participant device of the participant, a participant performing a predetermined gesture, a participant speaking a predetermined word and/or phrase, and/or a participant requesting a virtual assistant generated a note for the online meeting.

The method may then proceed to step 608 where, for each received indication of a predefined action, at least one of a keyword and a phrase may be extracted from the generated text data from the first predetermined time before the time stamp in which the predefined action occurred to the time stamp in which the predefined action occurred.

At step 610, a plurality of participant segments of the meeting data may be generated for each indication. Each participant segment may include a respective identifier and generated text data from a first predetermined time before the time stamp in which the predefined action occurred to the time stamp in which the predefined action occurred. Each participant segment may include at least transcriptions of audio data captured during a predetermined time around the predefined action for each respective meeting participant and/or host, as mentioned above. Additionally, or alternatively, the generated participant segment may include the generated text data from the first predetermined time before the time stamp in which the predefined action occurred to a second predetermined amount of time after the predefined action occurred, wherein the first predetermined amount of time and second predetermined amount of time are one of a same amount of time and a different amount of time. Further, the participant segment may include the extracted at least one of keyword and phrase.

The participant segments may also include audio data, video data, and/or other data of the meeting captured during the predetermined time around the predefined action for each respective meeting participant and/or host. For example, the participant segments may include the audio data, text data generated from the audio data, and/or any additional data captured during the predetermined time around the predefined action. Additional data may include video data, images of presentations, images of documents, etc. that were presented in the meeting during the predetermined time around the predefined action.

Then, at step 612, the extracted at least one of keyword and phrase may be used to determine whether the extracted at least one of keyword and phrase is present in the continuously generated text data other than each predetermined time around when a predefined action has occurred.

For each occurrence of the extracted at least one of keyword and phrase in the continuously generated text data other each predetermined time around when a predefined action has occurred, a machine learned segment of the meeting data may be generated at step 614. The machine learned segment may include generated text data from a first predetermined time before the occurrence of the extracted at least one of keyword and phrase to a time of occurrence of the extracted at least one of keyword and phrase.

Then, a summary of the meeting for each participant device may be generated at step 616. The summary may include a plurality of generated participant segments including the first identifier of the first participant device. Additionally, the summary may include one or more machine learned segments.

FIG. 7 depicts a method 700 for generating notes for a meeting based on participant actions and machine learning, according to embodiments of the present disclosure. Method 700 may begin at step 702 where meeting data from a plurality of participant devices participating in an online meeting may be received. The meeting data may include audio data generated during the online meeting from each participant device of the plurality of participant devices, and the meeting data may include a time stamp of when audio of the audio data occurred. Further, the meeting data may also include video data, images of presentations, images of documents, etc. that are presented during the online meeting At step 704, the method may continuously generate, when receiving meeting data, text data based on the received audio data from each participant device of the plurality of participant devices. The text data may be a transcription of audio captured during the online meeting and text data may include a time stamp of when the audio corresponding to the text data was captured.

At step 706, the method may iteratively perform the following steps until receiving meeting data for the meeting has ended. One step may include receiving, from a first participant device of the plurality of participant devices during receiving the meeting data, an indication that a predefined action has occurred on the first participating device, the indication including a time stamp in which the predefined action occurred and an first identifier that identifies the first participant device. The predefined action includes one or more of a participant clicking a physical button associated with the first participant device of the participant, a participant clicking a button displayed on a display screen of the first participant device of the participant, a participant performing a predetermined gesture, a participant speaking a predetermined word and/or phrase, and/or a participant requesting a virtual assistant generated a note for the online meeting.

Upon receiving the indication from the first participant device, at step 708, a participant segment of the meeting data for the first participant device may be generated. The participant segment data for the first participant device may include the first identifier and generated text data from a first predetermined time before the time stamp in which the predefined action occurred to the time stamp in which the predefined action occurred. Each participant segment may include at least transcriptions of audio data captured during a predetermined time around the predefined action for each respective meeting participant and/or host, as mentioned above. Additionally, or alternatively, the generated participant segment may include the generated text data from the first predetermined time before the time stamp in which the predefined action occurred to a second predetermined amount of time after the predefined action occurred, wherein the first predetermined amount of time and second predetermined amount of time are one of a same amount of time and a different amount of time.

At step 710, the method may receive, from a second participant device of the plurality of participant devices during receiving the meeting data, an indication that a predefined action has occurred on the second participating device, the indication including a time stamp in which the predefined action occurred and a second identifier that identifies the second participant device. The predefined action includes one or more of a participant clicking a physical button associated with the first participant device of the participant, a participant clicking a button displayed on a display screen of the first participant device of the participant, a participant performing a predetermined gesture, a participant speaking a predetermined word and/or phrase, and/or a participant requesting a virtual assistant generated a note for the online meeting.

Upon receiving the indication from the second participant device, at step 712, a participant segment of the meeting data for the second participant device may be generated. The participant segment may include the second identifier and generated text data from a first predetermined time before the time stamp in which the predefined action occurred to the time stamp in which the predefined action occurred. As mentioned above, each participant segment may include at least transcriptions of audio data captured during a predetermined time around the predefined action for each respective meeting participant and/or host, as mentioned above. Additionally, or alternatively, the generated participant segment may include the generated text data from the first predetermined time before the time stamp in which the predefined action occurred to a second predetermined amount of time after the predefined action occurred, wherein the first predetermined amount of time and second predetermined amount of time are one of a same amount of time and a different amount of time.

The participant segments may also include audio data, video data, and/or other data of the meeting captured during the predetermined time around the predefined action for each respective meeting participant and/or host. For example, the participant segments may include the audio data, text data generated from the audio data, and/or any additional data captured during the predetermined time around the predefined action. Additional data may include video data, images of presentations, images of documents, etc. that were presented in the meeting during the predetermined time around the predefined action.

The method then proceeds to step 714 where it is determined whether the receiving meeting data of the meeting has ended. In other words, it is determined whether the online meeting has completed and/or ended.

When receiving meeting data for the meeting has ended, at step 716, it may be determined whether text data of a participant segment of the meeting data for the first participant device overlaps text data of a participant segment of the meeting data for the second participant device.

When the text data of the participant segment of the meeting data for the first participant device overlaps text data of the participant segment of the meeting data for the second participant device, at least one of a keyword and a phrase from the overlapping text data may be extracted from the overlapping text data at step 718.

At step 520, a point of interest counter for overlapping text data may be increments. The point of interest counter may indicate that a plurality of participant segments have been generated for the overlapping text data. Further, at step 522, for each extracted at least one of keyword and phrase from the overlapping text data when receiving meeting data for the meeting has ended, it may be determined whether the extracted at least one of keyword and phrase is present in the generated text data other than the overlapping text data.

For each occurrence of the extracted at least one of keyword and phrase in the generated text data other than the overlapping text, a machine learned segment of the meeting data may be generated at step 724. The machine learned segment including generated text data from a first predetermined time before the occurrence of the extracted at least one of keyword and phrase to a time of occurrence of the extracted at least one of keyword and phrase. Then, a summary of the meeting for the first participant device and/or the second participant device may be generated at step 726. The summary may include a plurality of generated participant segments including the first identifier of the first participant device. Additionally, the summary may include one or more machine learned segments.

Figure 8:
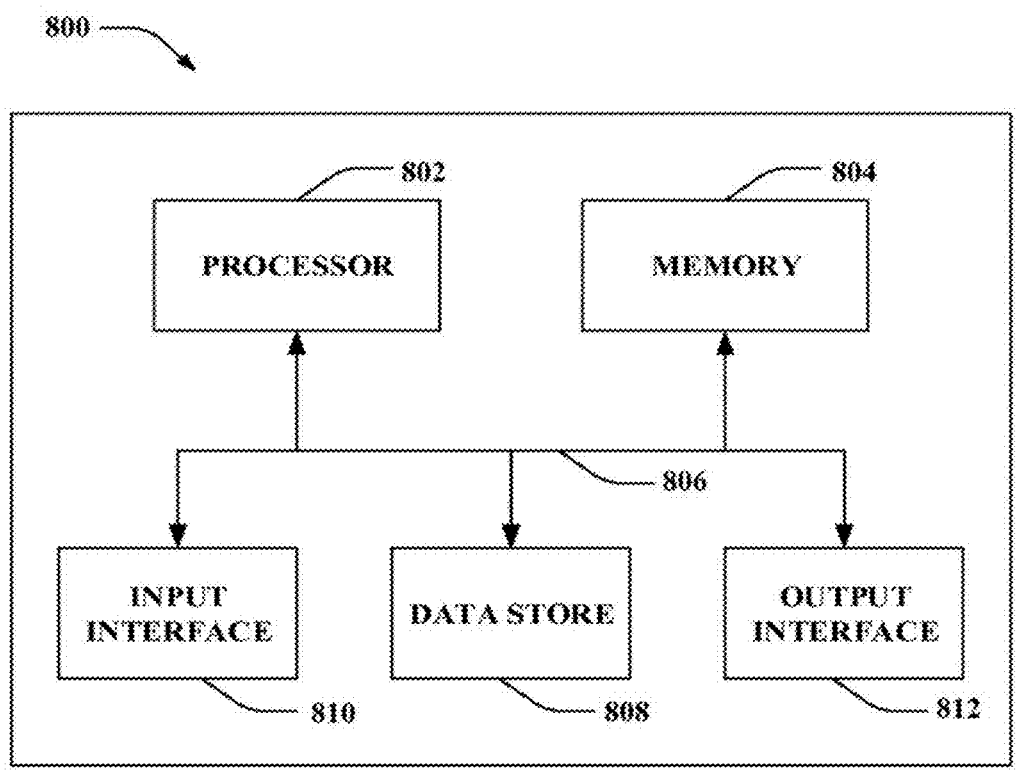
FIG. 8 depicts a high-level illustration of an exemplary computing device that may be used in accordance with the systems, methods, and computer-readable media disclosed herein, according to embodiments of the present disclosure.

FIG. 8 depicts a high-level illustration of an exemplary computing device 800 that may be used in accordance with the systems, methods, modules, and computer-readable media disclosed herein, according to embodiments of the present disclosure. For example, the computing device 800 may be used in a system that generates notes for a meeting based on participant actions and machine learning, according to embodiments of the present disclosure. The computing device 800 may include at least one processor 802 that executes instructions that are stored in a memory 804. The instructions may be, for example, instructions for implementing functionality described as being carried out by one or more components discussed above or instructions for implementing one or more of the methods described above. The processor 802 may access the memory 804 by way of a system bus 806. In addition to storing executable instructions, the memory 804 may also store data, audio, meetings, segments, keywords, phrases, events, and so forth.

The computing device 800 may additionally include a data store 808 that is accessible by the processor 802 by way of the system bus 806. The data store 808 may include executable instructions, data, examples, features, etc. The computing device 800 may also include an input interface 810 that allows external devices to communicate with the computing device 800. For instance, the input interface 810 may be used to receive instructions from an external computer device, from a user, etc. The computing device 800 also may include an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 may be included in an environment that provides substantially any type of user interface with which a user can interact. Examples of user interface types include graphical user interfaces, natural user interfaces, and so forth. For example, a graphical user interface may accept input from a user employing input device(s) such as a keyboard, mouse, remote control, or the like and may provide output on an output device such as a display. Further, a natural user interface may enable a user to interact with the computing device 800 in a manner free from constraints imposed by input device such as keyboards, mice, remote controls, and the like. Rather, a natural user interface may rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for example, several devices may be in communication by way of a network connection and may collectively perform tasks described as being performed by the computing device 800.

Figure 9:
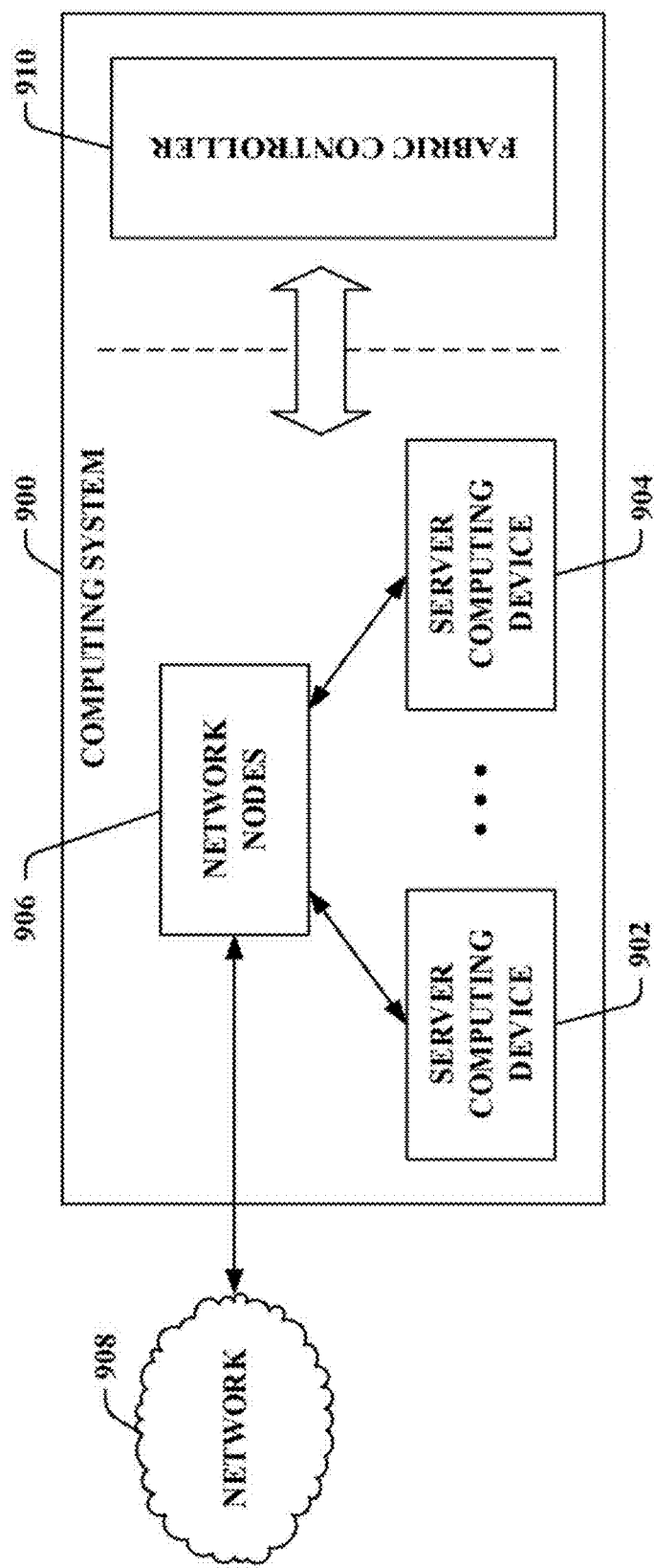
FIG. 9 depicts a high-level illustration of an exemplary computing system that may be used in accordance with the systems, methods, and computer-readable media disclosed herein, according to embodiments of the present disclosure.

Turning to FIG. 9, FIG. 9 depicts a high-level illustration of an exemplary computing system 900 that may be used in accordance with the systems, methods, modules, and computer-readable media disclosed herein, according to embodiments of the present disclosure. For example, the computing system 900 may be or may include the computing device 800. Additionally, and/or alternatively, the computing device 800 may be or may include the computing system 900.

The computing system 900 may include a plurality of server computing devices, such as a server computing device 902 and a server computing device 904 (collectively referred to as server computing devices 902-904). The server computing device 902 may include at least one processor and a memory; the at least one processor executes instructions that are stored in the memory. The instructions may be, for example, instructions for implementing functionality described as being carried out by one or more components discussed above or instructions for implementing one or more of the methods described above. Similar to the server computing device 902, at least a subset of the server computing devices 902-904 other than the server computing device 902 each may respectively include at least one processor and a memory. Moreover, at least a subset of the server computing devices 902-904 may include respective data stores.

Processor(s) of one or more of the server computing devices 902-904 may be or may include the processor, such as processor 802. Further, a memory (or memories) of one or more of the server computing devices 802-804 can be or include the memory, such as memory 804. Moreover, a data store (or data stores) of one or more of the server computing devices 902-904 may be or may include the data store, such as data store 808.

The computing system 900 may further include various network nodes 906 that transport data between the server computing devices 902-904. Moreover, the network nodes 906 may transport data from the server computing devices 902-904 to external nodes (e.g., external to the computing system 900) by way of a network 908. The network nodes 902 may also transport data to the server computing devices 902-904 from the external nodes by way of the network 908. The network 908, for example, may be the Internet, a cellular network, or the like. The network nodes 906 may include switches, routers, load balancers, and so forth.

A fabric controller 910 of the computing system 900 may manage hardware resources of the server computing devices 902-904 (e.g., processors, memories, data stores, etc. of the server computing devices 902-904). The fabric controller 910 may further manage the network nodes 906. Moreover, the fabric controller 910 may manage creation, provisioning, de-provisioning, and supervising of managed runtime environments instantiated upon the server computing devices 902-904.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein may be implemented in hardware, software, or any combination thereof. If implemented in software, the functions may be stored on and/or transmitted over as one or more instructions or code on a computer-readable medium. Computer-readable media may include computer-readable storage media. A computer-readable storage media may be any available storage media that may be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, may include compact disc ("CD"), laser disc, optical disc, digital versatile disc ("DVD"), floppy disk, and Blu-ray disc ("BD"), where disks usually reproduce data magnetically and discs usually reproduce data optically with lasers. Further, a propagated signal is not included within the scope of computer-readable storage media. Computer-readable media may also include communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio and microwave are included in the definition of communication medium. Combinations of the above may also be included within the scope of computer-readable media.

Alternatively, and/or additionally, the functionality described herein may be performed, at least in part, by one or more hardware logic components. For example, and without limitation, illustrative types of hardware logic components that may be used include Field-Programmable Gate Arrays ("FPGAs"), Application-Specific Integrated Circuits ("ASICs"), Application-Specific Standard Products ("ASSPs"), System-on-Chips ("SOCs"), Complex Programmable Logic Devices ("CPLDs"), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A computer-implemented method for generating notes for a meeting based on participant actions and machine learning, the method comprising:
receiving, over an electronic communications network, meeting data from a plurality of participant devices participating in an online meeting, the meeting data including audio data generated during the online meeting from the plurality of participant devices, and the meeting data including an audio time stamp of when audio of the audio data occurred;
continuously generating, by at least one server when receiving meeting data, text data based on the received audio data from each participant device of the plurality of participant devices, the text data being a transcription of audio captured during the online meeting and text data including the audio time stamp of when the audio corresponding to the text data was captured;
receiving, from a first participant device of the plurality of participant devices during receiving the meeting data, an indication that a first predefined action has occurred on the first participating device, the indication including a first action time stamp in which the first predefined action occurred and a first identifier that identifies the first participant device;
generating, by the at least one server, a first participant segment of the meeting data for the first participant device, the first participant segment including the first identifier and generated text data from a first predetermined time before the first action time stamp in which the first predefined action occurred to the first action time stamp in which the first predefined action occurred;
receiving, from a second participant device of the plurality of participant devices during receiving the meeting data, an indication that a second predefined action has occurred on the second participating device, the indication including a second action time stamp in which the second predefined action occurred and a second identifier that identifies the second participant device;
generating, by the at least one server, a second participant segment of the meeting data for the second participant device, the second participant segment including the second identifier and generated text data from the first predetermined time before the second action time stamp in which the second predefined action occurred to the second action time stamp in which the second predefined action occurred;
determining whether text data of the first participant segment overlaps text data of the second participant segment;
extracting, when the text data of the first participant segment overlaps text data of the second participant segment, at least one of a keyword and a phrase from the overlapping text data; and
generating a summary of the meeting for the first participant device, the summary including the first participant segment and the extracted at least one of keyword and phrase from the overlapping text data.

2. The method according to claim 1, wherein a predefined action of one or more of the first and second predefined actions includes one or more of a participant clicking a physical button associated with a participant device of the participant, a participant clicking a button displayed on a display screen of the participant device of the participant, a participant performing a predetermined gesture, a participant speaking a predetermined word and/or phrase, and a participant requesting a virtual assistant generated a note for the meeting.

3. The method according to claim 1, further comprising:
extracting at least one of a keyword and a phrase from the generated text data from the first predetermined time before the first action time stamp in which the first predefined action occurred to the first action time stamp in which the first predefined action occurred, and
wherein the first participant segment further includes the extracted at least one of keyword and phrase from the generated text data from the first predetermined time before the first action time stamp in which the first predefined action occurred to the first action time stamp in which the first predefined action occurred.

4. The method according to claim 3, further comprising:
determining whether the extracted at least one of keyword and phrase is present in the continuously generated text data other than the first predetermined time before the first action time stamp in which the first predefined action occurred to the first action time stamp in which the first predefined action occurred; and
generating, for each occurrence of the extracted at least one of keyword and phrase in the continuously generated text data other than the first predetermined time before the first action time stamp in which the first predefined action occurred to the first action time stamp in which the first predefined action occurred, a machine learned segment of the meeting data, the machine learned segment including generated text data from a first predetermined time before the occurrence of the extracted at least one of keyword and phrase to a time of occurrence of the extracted at least one of keyword and phrase.

5. The method according to claim 3, further comprising:
determining, for each extracted at least one of keyword and phrase of a participant segment when receiving meeting data for the meeting has ended, whether the extracted at least one of keyword and phrase is present in the generated text data other than the text data of the first participant segment; and
generating, for each occurrence of the extracted at least one of keyword and phrase in the generated text data other than the text data of the first participant segment, a machine learned segment of the meeting data, the machine learned segment including generated text data from a first predetermined time before the occurrence of the extracted at least one of keyword and phrase to a time of occurrence of the extracted at least one of keyword and phrase.

6. The method according to claim 1, further comprising:
incrementing a point of interest counter for overlapping text data, the point of interest counter indicating that a plurality of participant segments have been generated for the overlapping text data.

7. The method according to claim 1, further comprising:
determining, for each extracted at least one of keyword and phrase from the overlapping text data when receiving meeting data for the meeting has ended, whether the extracted at least one of keyword and phrase is present in the generated text data other than the overlapping text data; and generating, for each occurrence of the extracted at least one of keyword and phrase in the generated text data other than the overlapping text, a machine learned segment of the meeting data, the machine learned segment including generated text data from a first predetermined time before the occurrence of the extracted at least one of keyword and phrase to a time of occurrence of the extracted at least one of keyword and phrase.

8. The method according to claim 1, wherein generating the first participant segment includes:

generating the first participant segment of the meeting data for the first participant device, the generated first participant segment including the first identifier and the generated text data from the first predetermined time before the first action time stamp in which the first predefined action occurred to a second predetermined amount of time after the first predefined action occurred, wherein the first predetermined amount of time and second predetermined amount of time are one of a same amount of time and a different amount of time.

9. The method according to claim 1, further comprising:

determining, when receiving meeting data for the meeting has ended, whether the generated text data includes at least one of a predetermined time-based keyword and a predetermined time-based phrase;

generating, when the generated text data includes the at least one of the predetermined time-based keyword and the predetermined time-based phrase, a time-based segment for a predetermined time around the at least one of the predetermined time-based keyword and the predetermined time-based phrase, the time-based segment including the generated text data from the predetermined time around the at least one of the predetermined time-based keyword and the predetermined time-based phrase; and generating, for each time-based segment, a follow-up action, the follow-up action including one or more of a calendar invite and a reminder based on the generated text data of the time-based segment.

10. The method according to claim 1, further comprising:

determining, when receiving meeting data for the meeting has ended, whether the generated text data includes at least one of a predetermined emphasis keyword and a predetermined emphasis phrase; and generating, when the generated text data includes the at least one of the predetermined emphasis keyword and the predetermined emphasis phrase, an emphasis segment for a predetermined time around the at least one of the predetermined emphasis keyword and the predetermined emphasis phrase, the emphasis segment including the generated text data from the predetermined time around the at least one of the predetermined emphasis keyword and the predetermined emphasis phrase, wherein the summary further includes a plurality of generated emphasis segments.

11. The method according to claim 1, further comprising:

receiving, from at least one participant device, an edit to the text data of the transcription of audio captured during the online meeting;

generating new text data based on the received audio data from each participant device of the plurality of participant devices and the edit to the text data of the transcription of audio captured during the online meeting.

12. A system for generating smart notes for a meeting based on participant actions and machine learning, the system including:

a data storage device that stores instructions for generating smart notes for a meeting based on participant actions and machine learning; and a processor configured to execute the instructions to perform a method including:

receiving, over an electronic communications network, meeting data from a plurality of participant devices participating in an online meeting, the meeting data including audio data generated during the online meeting from the plurality of participant devices, and the meeting data including an audio time stamp of when audio of the audio data occurred;

continuously generating, when receiving meeting data, text data based on the received audio data from each participant device of the plurality of participant devices, the text data being a transcription of audio captured during the online meeting and text data including the audio time stamp of when the audio corresponding to the text data was captured;

receiving, from a first participant device of the plurality of participant devices during receiving the meeting data, an indication that a first predefined action has occurred on the first participating device, the indication including a first action time stamp in which the first predefined action occurred and a first identifier that identifies the first participant device;

generating a first participant segment of the meeting data for the first participant device, the first participant segment including the first identifier and generated text data from a first predetermined time before the first action time stamp in which the first predefined action occurred to the first action time stamp in which the first predefined action occurred;

receiving, from a second participant device of the plurality of participant devices during receiving the meeting data, an indication that a second predefined action has occurred on the second participating device, the indication including a second action time stamp in which the second predefined action occurred and a second identifier that identifies the second participant device;

generating a second participant segment of the meeting data for the second participant device, the second participant segment including the second identifier and generated text data from the first predetermined time before the second action time stamp in which the second predefined action occurred to the second action time stamp in which the second predefined action occurred;

determining whether text data of the first participant segment overlaps text data of the second participant segment;

extracting, when the text data of the first participant segment overlaps text data of the second participant segment, at least one of a keyword and a phrase from the overlapping text data; and generating a summary of the meeting for the first participant device, the summary including the first participant segment and the extracted at least one of keyword and phrase from the overlapping text data.

13. The system according to claim 12, wherein the processor is further configured to execute the instructions to perform the method including:
extracting at least one of a keyword and a phrase from the generated text data from the first predetermined time before the first action time stamp in which the first predefined action occurred to the first action time stamp in which the first predefined action occurred, and
wherein the first participant segment further includes the extracted at least one of keyword and phrase from the generated text data from the first predetermined time before the first action time stamp in which the first predefined action occurred to the first action time stamp in which the first predefined action occurred.

14. The system according to claim 13, wherein the processor is further configured to execute the instructions to perform the method including:
determining whether the extracted at least one of keyword and phrase is present in the continuously generated text data other than the first predetermined time before the first action time stamp in which the first predefined action occurred to the first action time stamp in which the first predefined action occurred; and
generating, for each occurrence of the extracted at least one of keyword and phrase in the continuously generated text data other than the first predetermined time before the first action time stamp in which the first predefined action occurred to the first action time stamp in which the first predefined action occurred, a machine learned segment of the meeting data, the machine learned segment including generated text data from a first predetermined time before the occurrence of the extracted at least one of keyword and phrase to a time of occurrence of the extracted at least one of keyword and phrase.

15. The system according to claim 13, wherein the processor is further configured to execute the instructions to perform the method including:
determining, for each extracted at least one of keyword and phrase of a participant segment when receiving meeting data for the meeting has ended, whether the extracted at least one of keyword and phrase is present in the generated text data other than the text data of the first participant segment; and
generating, for each occurrence of the extracted at least one of keyword and phrase in the generated text data other than the text data of the first participant segment, a machine learned segment of the meeting data, the machine learned segment including generated text data from a first predetermined time before the occurrence of the extracted at least one of keyword and phrase to a time of occurrence of the extracted at least one of keyword and phrase.

16. The system according to claim 12, wherein the processor is further configured to execute the instructions to perform the method including:
incrementing a point of interest counter for overlapping text data, the point of interest counter indicating that a plurality of participant segments have been generated for the overlapping text data.

17. The system according to claim 12, wherein the processor is further configured to execute the instructions to perform the method including:
determining, for each extracted at least one of keyword and phrase from the overlapping text data when receiving meeting data for the meeting has ended, whether the extracted at least one of keyword and phrase is present in the generated text data other than the overlapping text data; and
generating, for each occurrence of the extracted at least one of keyword and phrase in the generated text data other than the overlapping text, a machine learned segment of the meeting data, the machine learned segment including generated text data from a first predetermined time before the occurrence of the extracted at least one of keyword and phrase to a time of occurrence of the extracted at least one of keyword and phrase.

18. A computer-readable storage device storing instructions that, when executed by a computer, cause the computer to perform a method for generating smart notes for a meeting based on participant actions and machine learning, the method including:
receiving, over an electronic communications network, meeting data from a plurality of participant devices participating in an online meeting, the meeting data including audio data generated during the online meeting from the plurality of participant devices, and the meeting data including an audio time stamp of when audio of the audio data occurred;
continuously generating, when receiving meeting data, text data based on the received audio data from each participant device of the plurality of participant devices, the text data being a transcription of audio captured during the online meeting and text data including the audio time stamp of when the audio corresponding to the text data was captured;
receiving, from a first participant device of the plurality of participant devices during receiving the meeting data, an indication that a first predefined action has occurred on the first participating device, the indication including a first action time stamp in which the first predefined action occurred and a first identifier that identifies the first participant device;
generating a first participant segment of the meeting data for the first participant device, the first participant segment including the first identifier and generated text data from a first predetermined time before the first action time stamp in which the first predefined action occurred to the first action time stamp in which the first predefined action occurred;
receiving, from a second participant device of the plurality of participant devices during receiving the meeting data, an indication that a second predefined action has occurred on the second participating device, the indication including a second action time stamp in which the second predefined action occurred and a second identifier that identifies the second participant device;
generating a second participant segment of the meeting data for the second participant device, the second participant segment including the second identifier and generated text data from the first predetermined time before the second action time stamp in which the second predefined action occurred to the second action time stamp in which the second predefined action occurred;
determining whether text data of the first participant segment overlaps text data of the second participant segment;
extracting, when the text data of the first participant segment overlaps text data of the second participant segment, at least one of a keyword and a phrase from the overlapping text data; and generating a summary of the meeting for the first participant device, the summary including the first participant segment and the extracted at least one of keyword and phrase from the overlapping text data.

19. The computer-readable storage device according to claim 18, wherein the steps further include:

extracting at least one of a keyword and a phrase from the generated text data from the first predetermined time before the first action time stamp in which the first predefined action occurred to the first action time stamp in which the first predefined action occurred, and wherein the first participant segment further includes the extracted at least one of keyword and phrase from the generated text data from the first predetermined time before the first action time stamp in which the first predefined action occurred to the first action time stamp in which the first predefined action occurred.

20. The computer-readable storage device according to claim 18, wherein the steps further include:

determining, for each extracted at least one of keyword and phrase from the overlapping text data when receiving meeting data for the meeting has ended, whether the extracted at least one of keyword and phrase is present in the generated text data other than the overlapping text data; and generating, for each occurrence of the extracted at least one of keyword and phrase in the generated text data other than the overlapping text, a machine learned segment of the meeting data, the machine learned segment including generated text data from a first predetermined time before the occurrence of the extracted at least one of keyword and phrase to a time of occurrence of the extracted at least one of keyword and phrase.

* * * * *